United States Patent [19]

Reznickenko et al.

[11] Patent Number: 5,232,528
[45] Date of Patent: Aug. 3, 1993

[54] KEY WITH LABEL AND METHOD OF ATTACHING SAME

[75] Inventors: Yury Reznickenko, Twinsburg, Ohio; George Wasko, Meadville, Pa.; Thomas M. Gordon, Middleburg Hts., Ohio

[73] Assignee: American Consumer Products, Inc., Solon, Ohio

[21] Appl. No.: 734,601

[22] Filed: Jul. 23, 1991

[51] Int. Cl.$^5$ ...................... B32B 31/16; E05B 19/24
[52] U.S. Cl. .................................. 156/73.1; 156/252; 156/253; 70/460; 40/330
[58] Field of Search ................. 156/73.1, 91, 92, 102, 156/290, 379.8, 380.6, 380.8, 252, 253, 250; 283/74, 81; 70/460; 40/330, 634

[56] References Cited

U.S. PATENT DOCUMENTS

| | | | |
|---|---|---|---|
| 2,759,279 | 8/1956 | Schlage | 40/330 |
| 2,759,280 | 8/1956 | Schlage | 40/330 |
| 3,204,360 | 9/1965 | Ehmcke | 40/330 |
| 3,209,479 | 10/1965 | Manzardo | 40/330 |
| 3,402,088 | 9/1968 | Young et al. | 156/290 X |
| 3,809,596 | 5/1974 | Gidge | 156/380.8 |
| 4,417,410 | 11/1983 | Freedom | 40/330 |
| 4,647,325 | 3/1987 | Bach | 156/73.1 |
| 4,696,711 | 9/1987 | Greszczuk | 156/253 X |
| 4,849,277 | 7/1989 | Jaklofsky | 156/252 X |

*Primary Examiner*—David A. Simmons
*Assistant Examiner*—J. Sells
*Attorney, Agent, or Firm*—Fay, Sharpe, Beall, Fagan, Minnich & McKee

[57] ABSTRACT

Various methods are disclosed for securing a label, such as a bar code label, to a key blank. A first layer, preferably formed from any clear or solid plastic, includes indicia defining the bar code information. The first layer is welded, fused, or rivet connection to a second layer, again preferably formed from plastic, through a key opening. Alternatively, a rivet extends through the key opening and mechanically retains the first layer to the key blank.

5 Claims, 2 Drawing Sheets

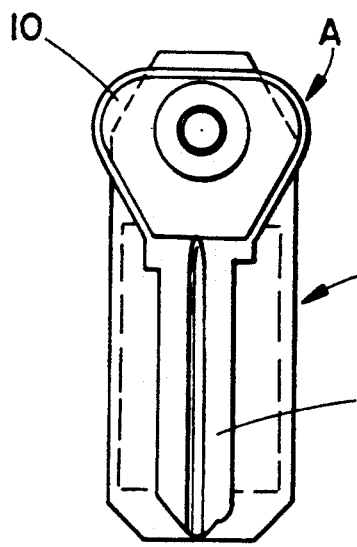
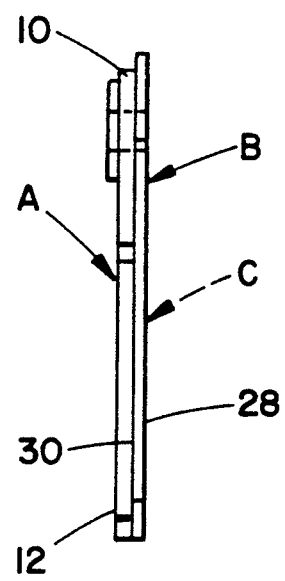
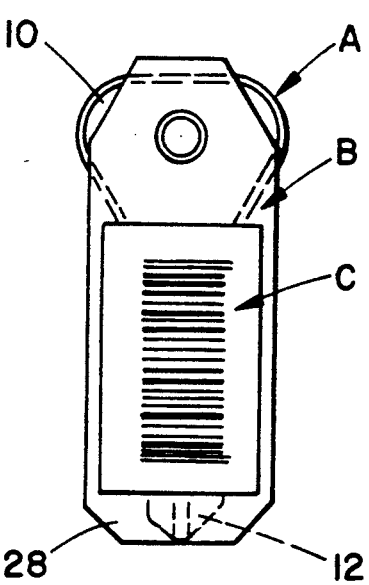
FIG. 1  FIG. 2  FIG. 3
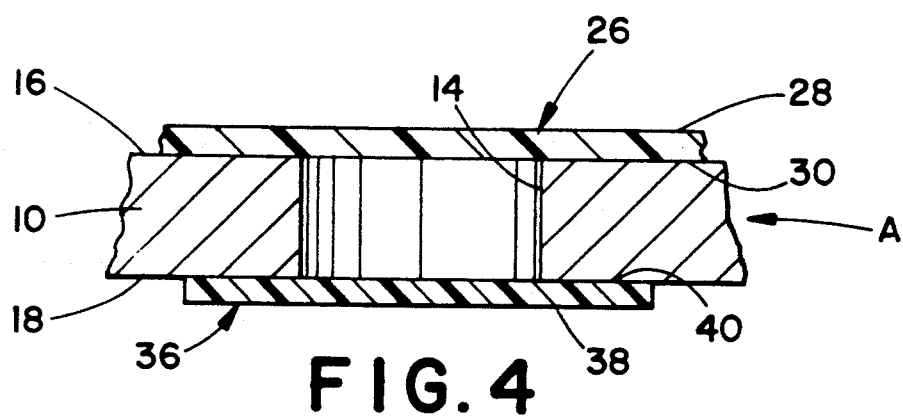
FIG. 4
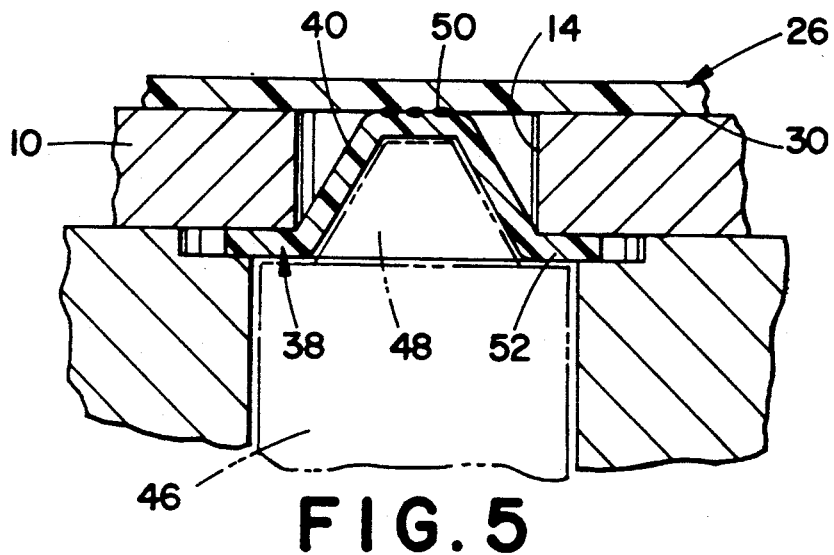
FIG. 5

KEY WITH LABEL AND METHOD OF ATTACHING SAME

BACKGROUND OF THE INVENTION

This invention pertains to the art of key blanks and more particularly to placing of a label on key blanks.

The invention is particularly applicable to a key blank to which is attached a Universal Product Code (UPC) and will be described with particular reference thereto. However, it will be appreciated that the invention may be advantageously employed to secure other labels to key blanks and the like.

Manufacturers of key blanks have come under the same pressure as other manufacturers who sell their products to retail stores. That is, an increased reliance on bar code readers by the retailers requires the manufacturers to be sure their product is compatible with the bar code system.

Bar code labels are in widespread use in retail stores because of their convenience and the benefits offered thereby. Specifically, the bar code labels include indicia, typically a series of bars of varying width or spacing, that is scanned by a conventional scanner, such as a hand-held wand. The wand converts the binary information of the label into an electrical signal that is easily processed. That information is then forwarded to the store's computer which provides pricing, inventory, and similar information. In this manner, price changes can be easily incorporated storewide without re-tagging or re-marking each individual product. Additionally, the store owner is able to quickly and effectively monitor his inventory.

To date, the application of bar code labels to key blanks has been unknown. It is believed that the majority of retailers selling key blanks continue the longstanding practice of storing a small number of various key blanks on a series of wire-type hooks. The retailers then rely on visual monitoring for inventory control. Further, the sales clerk manually enters pricing and product information into the cash register when a sale is made.

This is unfortunate because of the problems it presents when most, if not all, of the remaining products sold by the retailer are adaptable to the UPC bar code label. A sales clerk or cashier is then required to manually enter price and product information. This is much slower, more prone to human error, and still does not offer all of the benefits provided by the bar code label. Additionally, provision must be made to specify the pricing information in an alternative manner. Thus, it is apparent that adaptability of this bar code label technology to key blanks has proved to be troublesome.

SUMMARY OF THE INVENTION

The present invention contemplates a new and improved combination of a key blank and bar code label that overcomes all of the above-referred to problems and others, as well as methods of interconnecting the label to the key blank in simple, economical ways.

According to the present invention, a bar code label is conveniently and effectively attached to a key blank.

According to another aspect of the invention, a variety of methods can be used to attach the label to the key blank. According to a more limited aspect of the invention, a first plastic layer is disposed along one face of the key, a second plastic layer disposed along a second face of the key, and the first and second layers connected together through a key opening.

According to yet another aspect of the invention, the first and second plastic layers are fusion bonded or welded together, or rivet connection.

According to a still further aspect of the invention, an intermediate material is disposed between the first and second layers prior to the fusion bonding step.

A principal advantage of the invention is the ability to attach a bar code label to a key blank.

Still another advantage of the invention is found in the simplified manner of connecting the label and key blank.

A still further advantage of the invention is found in the ability to effectively monitor inventory, pricing and other product information for key blanks as is already done for many retail products.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred and alternate embodiments of which will be described in detail in this specification and illustrated in the accompanying drawings which form a part hereof, and wherein:

FIG. 1 is a front, plan view of the key blank and label connected thereto;

FIG. 2 is a side elevational view taken generally from the right-hand side of FIG. 1;

FIG. 3 is a rear plan view of the label and key blank;

FIG. 4 is an enlarged, cross-sectional view illustrating a location of plastic material with the key blank;

FIG. 5 is an enlarged, cross-sectional view illustrating a step in connecting a label and key blank according to an ultrasonic method;

DETAILED DESCRIPTION OF THE PREFERRED EMBODIMENTS

Figure 6:
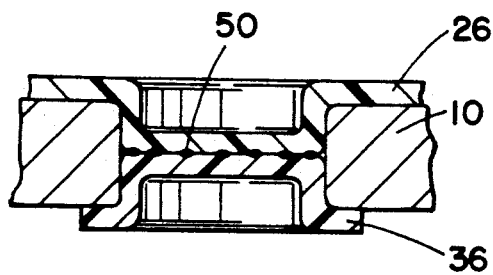
FIG. 6 shows an alternative method of connecting the plastic layers with the ultrasonic method.

Referring now to the drawings wherein the showings are for purposes of illustrating preferred and alternate embodiments of the invention only and not for purposes of limiting same, the FIGURES show a key or key blank A secured to a label B having indicia c.

More particularly, the key blank A includes opposed first and second ends 10, 12. The enlarged first end typically includes an opening 14 (FIG. 4) that extends entirely through the key blank from a first face 16 to a second face 18. The opening is used to hang the key blank from a wire hook or attach cut key to a key ring in a well known manner.

As illustrated, the second end of the key is not machined, i.e., a blank, although it will be understood that this invention is equally applicable to either a machined key or key blank.

A label B is preferably defined by a first layer 26 which has substantially the same dimension as that of the key blank. Although other materials can be used, typically a plastic material, such as a polyester, having an approximate thickness of 0.010 to 0.015 inches has been used with success. Of course, still other materials can be used without departing from the scope and intent of the subject invention. Preferably, the first plastic layer is absent of any openings and has indicia means C secured thereto in any well known manner. The indicia means is preferably a Universal Product Code (UPC) bar code label that is defined by a series of spaced lines. The lines have a variable thickness and spacing therebetween to convey information in binary form when a scanner is passed over it. For example, the scanner can be a hand-held wand or a scanner that is built into a checkout counter line. The bar code label is optically scanned and a signal transmitted to a central processor unit or computer for pricing and inventory purposes. Details of the structure and operation of a UPC bar code label and scanner are well known in the art so that further description thereof is deemed unnecessary to a full and complete understanding of the present invention.

Preferably, the indicia means is placed on an outer surface 28 of the first plastic layer as opposed to the inner or second surface 30 that faces the first face 16 of the key. The indicia means can be inked onto the first layer or comprise a separate element that is secured to the first plastic layer. As particularly illustrated in FIG. 4, the first plastic layer is originally absent of any openings therethrough so that it covers and closes off the opening 14 of the key blank.

In a similar manner, a second plastic layer 36 is positioned adjacent the second face 18 of the key blank. As shown, the second plastic layer is preferably substantially reduced in dimension relative to the first plastic layer. It, too, includes an outer face 38 and an inner face 40 that is disposed adjacent the second face 18 of the key blank. Originally, the second plastic layer also is void of any openings so as to cover and close off the opening 14 of the key blank along the second face 18 thereof. Thus, and as particularly illustrated in FIG. 4, the key blank opening 14 is closed off by the first and second plastic layers.

Figure 7:
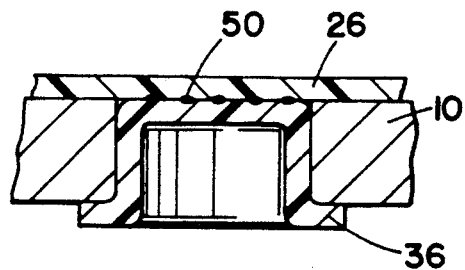
FIG. 7 illustrates a third alternative for connecting the plastic layers with the ultrasonic method.

Thereafter, and as illustrated in FIGS. 5–7, at least one of the plastic layers is deformed into the cavity defined by the opening. More specifically, and with reference to FIG. 5, the second plastic layer 36 is pushed or deformed inwardly into abutting engagement with the first plastic layer. A deforming member 46 has a generally frusto-conical end 48 dimensioned to urge a central portion of the second plastic layer into engagement with the inner face 30 of the plastic layer. The deforming member may itself define a portion of associated fusion bonding equipment that fusion bonds or welds the face 40 of the second plastic layer to the inner face 30 of the first plastic layer and as represented by numeral 50 in the drawings.

Although the periphery of the second plastic layer is drawn inwardly due to the inward deformation of the central portion, a circumferentially continuous flange or lip 52 still engages a second face of the key blank. This lip securely connects the label or indicia means associated with the first plastic layer 26 to the key blank.

In a first modified arrangement shown in FIG. 6, both the first and second plastic layers 26, 36 are deformed inwardly into the cavity defined by the key blank opening. In this arrangement, a generally cylindrical deforming member is used so that the wall of the key blank opening is engaged along a substantial portion by the deformed first and second plastic layers. Again, the layers are then fusion bonded or welded together to secure the label to the key blank.

In FIG. 7, the second plastic layer is again deformed or pushed entirely through the opening and into abutting engagement with the first plastic layer. Thereafter, the layers may be ultrasonically welded together. The primary distinction over that arrangement described with respect to FIG. 5 is the use of a generally cylindrical deforming member to result in a greater weld area interface between the first and second plastic layers.

Figure 8:
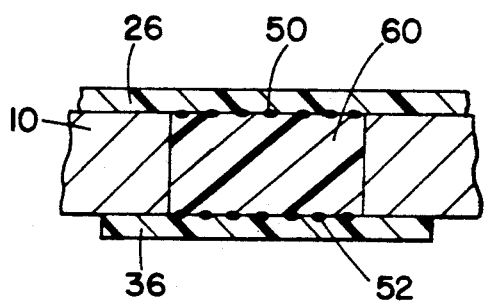
FIG. 8 illustrates a fourth alternative method for connecting the plastic layers in which the ultrasonic method uses plastic pellets.

In FIG. 8, an intermediate material 60 substantially fills the key blank opening. For example, plastic pellets or the like can be disposed in the opening. Then two weld regions 50, 52 at the interface between this intermediate material and the first plastic layer 26 and second plastic layer 36, result. In all other respects, this embodiment is substantially similar to the method and structure described with respect to that of FIGS. 1–5.

Figure 9:
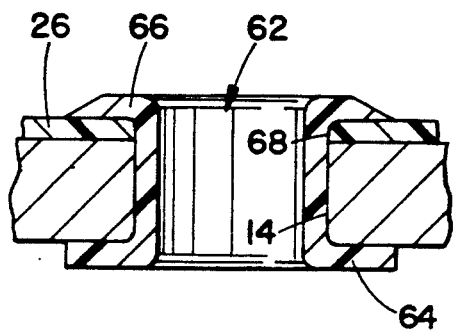
FIG. 9 is an enlarged, cross-sectional view illustrating an alternative manner of connecting a label to a key blank using plastic rivet with a mechanical or heating connection method.

In FIG. 9, a second plastic layer is not required. Instead, a plastic rivet 62 is sized to closely fit through the key blank opening. The rivet includes a circumferential flange 64 at one end that abuts the second face 18 of the key blank and a circumferential flange 66 disposed at the other end for locking engagement through an opening 68 formed in the first plastic layer. The rivet can either define a mere mechanical interconnection between the key blank and first plastic layer or, alternatively, also be heated, fusion bonded, or the like to the first plastic layer.

Figure 10:
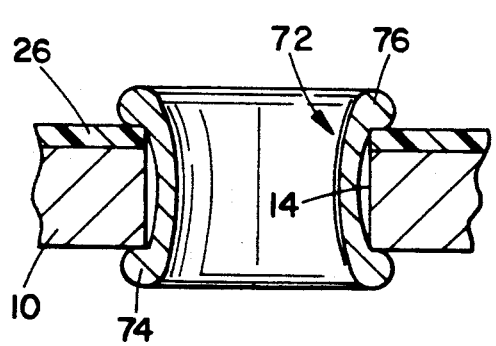
FIG. 10 illustrates yet another alternative manner of connecting a label to a key blank with a metal rivet.

In much the same manner, a metal rivet 72 having opposed, deformed shoulders or circumferential flanges 74, 76 can be used to secure the first plastic layer to the key blank as shown in FIG. 10. According to this arrangement, a mere mechanical connection is thus provided.

Figure 11:
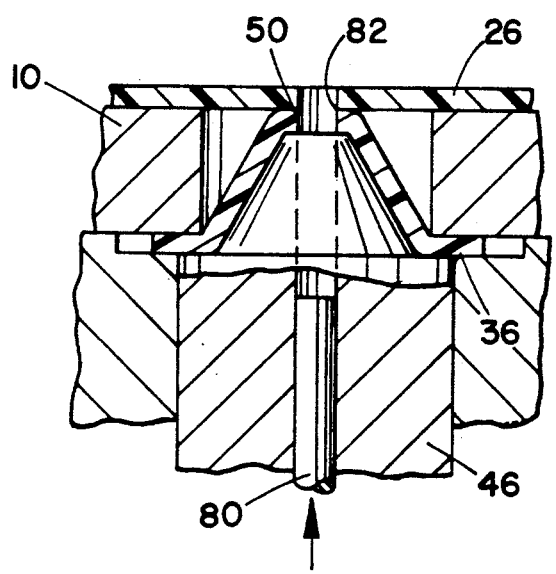
FIG. 11 illustrates a hole punching operation for ultrasonic method for storing keys on a display board.

In FIG. 11, a punch member 80 is axially reciprocated as indicated by the arrow to pierce the weld region 50 formed between a first and second plastic layers. As shown, the punch member can be formed as a portion of the deforming member to reduce the number of elements required to complete the operation. In this manner, an opening 82, generally concentric with the key opening 14, is formed in the finished combination of key blank and label.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A method of attaching a bar code label to a key wherein the label is capable of being scanned by a scanner to read information therefrom, the key having a single opening therethrough extending from a first face to a second face thereof, the method comprising the steps of:

placing a first plastic layer operatively associated with the label along the first face of the key and covering the single opening; placing a second plastic layer along the second face of the key and covering the single opening;

plastically deforming at least one of the first and second layers at least partially through the opening; and, fusion bonding the first and second plastic layers together through the single opening.

2. The method as defined in claim 1 comprising the further step of forming an opening through the fusion bonded layers within the single opening.

3. The method as defined in claim 1 comprising the further step of disposing a material in the single opening and intermediate the first and second layers.

4. The method as defined in claim 3 wherein the fusion bonding step connects the first layer, second layer and intermediate material together.

5. The method as defined in claim 1 comprising the further step of deforming one of the layers through the single opening and into abutting engagement with the other layer prior to the fusion bonding step.

* * * * *